United States Patent [19]

Wilkes

[11] 4,054,190
[45] Oct. 18, 1977

[54] MECHANICAL BRAKING APPARATUS

[75] Inventor: Donald F. Wilkes, Albuquerque, N. Mex.

[73] Assignee: Decoto Aircraft, Inc., Yakima, Wash.

[21] Appl. No.: 625,709

[22] Filed: Oct. 24, 1975

[51] Int. Cl.² .................................. B65H 59/10
[52] U.S. Cl. .................. 188/67; 74/531; 188/82.8; 192/45.1; 248/410
[58] Field of Search ............... 188/67, 82.8; 74/531; 192/41 R, 41 A, 45.1; 254/29 R, 106, 107; 248/355, 125, 410, 246

[56] References Cited
U.S. PATENT DOCUMENTS

| | | | |
|---|---|---|---|
| 1,352,172 | 9/1920 | Brandon | 188/67 X |
| 2,217,752 | 10/1940 | Jandus | 74/531 |
| 2,227,397 | 12/1940 | Lucker | 188/67 X |
| 2,579,305 | 12/1951 | Cushman | 188/67 X |
| 2,707,108 | 4/1955 | Schottler | 188/67 X |
| 2,893,766 | 7/1959 | Meyer | 74/531 X |
| 3,012,292 | 12/1961 | Brengman | 188/67 X |
| 3,058,083 | 10/1962 | Schneider | 74/531 X |
| 3,083,802 | 4/1963 | Stageberg | 192/45.1 |
| 3,311,204 | 3/1967 | Barnard | 192/45.1 X |
| 3,313,190 | 4/1967 | Bothum | 188/67 X |

Primary Examiner—George E. A. Halvosa
Attorney, Agent or Firm—Burns, Doane, Swecker & Mathis

[57] ABSTRACT

A mechanical brake is disclosed which includes a plurality of mutually inclined braking elements that are arranged in force transmitting relationship with one another such that the friction force exerted on a member moving relatively with respect to the braking elements is geometrically related to the friction force exerted by each adjacent braking element. Each braking element is designed to engage a guide so that friction locking is avoided. The plurality of braking elements may be effected with a single unitary body or may comprise a plurality of hingedly connected members or a plurality of members with mutually inclined edges in abutment with one another. Applications of the braking elements to both linear and rotary devices are illustrated as well as configurations which may be assumed by the braking elements and respective guides. Braking apparatus using a plurality of sets of braking elements is also disclosed. Examples of the specific use of the braking apparatus in a pipe control apparatus and a rotary device are also disclosed.

36 Claims, 35 Drawing Figures

MECHANICAL BRAKING APPARATUS

BACKGROUND OF THE INVENTION

This invention concerns mechanical apparatus for braking or otherwise inhibiting relative movement between two members. More specifically, this invention relates to the use of a plurality of mutually inclined braking elements which are operatively interrelated such that the friction force exerted by each braking element on a relatively rotating member is geometrically related to that friction force exerted by each adjacent braking element.

Braking, or relative motion inhibiting devices, have long been known which employ friction between two relatively moving members as the mechanism to control or otherwise limit the relative motion. In those situations where the relatively moving member whose motion is to be controlled by the brake has a large inertia, a high velocity or a high acceleration, correspondingly high friction forces are necesssary in order to effectively provide the requisite control.

Since it is well known that the friction force is related to the force normal to the relatively moving surfaces by a generally constant coefficient classically known as the friction coefficient having an order of magnitude much less than one, it will be apparent that the large friction forces required in situations as described above must be generated by even higher normal forces.

To permit the use of relatively low level control forces to effect the large braking forces often required, suitable force multiplication apparatus is frequently required in braking systems. A typical example of a force multiplying system is that of a servo actuated hydraulic cylinder in which the servo is controlled by a relatively small input force and a high pressure in the hydraulic cylinder system generates the corresponding normal force needed for the braking system. The known force multiplication systems are now endowed with a great reliability where only intermittent use is required over extended time periods such as on the order of 40 years. Accordingly, in such systems where reliability is very important, hydraulic systems for providing the necessary force are inadequate and designers must rely on truly mechanical systems.

With purely mechanical systems, care must be exercised to guard against friction locking. When the friction force generated by the normal force exceeds the component of the applied force in the direction which the friction acts, friction locking occurs, and effectively prohibits relative movement between the brake element and the movable member.

Another problem frequently presented to designers of mechanical force amplification systems, concerns the ability to design a system which enables small control forces to be used in generating the required large normal forces. This problem is further complicated when it is desired to design a system which is readily adaptable to accomodate different force levels.

Accordingly, it will be apparent that there still exists a need for a truly effective mechanical force amplification system which is both modular in nature, self-energizing and which avoids the problem of friction locking while still permitting large friction forces and therefore large normal forces to be generated and controlled by the use of small control force. It will be observed that mechanical force multiplication systems which have been used in the past have also required large volumes of space necessary to effect the force multiplication.

OBJECTS AND SUMMARY OF THE INVENTION

It is therefore a general object of the present invention to provide a force multiplication system which overcomes problems of the type heretofore discussed.

It is another object of the present invention to provide a force multiplication system which directly acts on one of the two relatively movable members to exert the motion inhibiting force, and which is suitable both for linear and rotary motion.

It is another object of the present invention to provide a force multiplication system comprising a plurality of mutually inclined active elements in which the friction force exerted by each element is geometrically related to the friction force exerted by each of the adjacent elements, but does not require the parts to be manufactured within close tolerances.

A relative motion inhibiting apparatus intended to substantially accomplish the foregoing objects as well as many others includes a member having a surface which is engaged by a plurality of mutually inclined element means that are arranged in force transmitting relation to one another such that there are a pair of terminal element means that may be spaced apart along the member. Each element means is provided with a friction surface which contacts the surface of the member and the plurality of element means cooperate with one another such that the friction force generated by each successive element between the two terminal elements is essentially geometrically related to the friction force generated by each adjacent element means.

A suitable restricting means is preferably provided to inhibit the movement of one terminal element means of the plurality of element means while providing an abutment. In addition, a suitable control means is operatively connected with the other terminal element means and is effective to apply a control force on the other terminal element.

Each element means is preferably designed such that the force applied to the element acts adjacent to the ends thereof. With a line drawn intersecting the centers of applied force at each end of the element means, and the element means itself being designed such that the line defines an angle with respect to the surface normal of the member, which angle exceeds the arctangent of the friction coefficient, the friction locking between the element means and the member is essentially avoided.

DESCRIPTION OF THE DRAWINGS

A preferred embodiment of the invention is illustrated in the drawings wherein like reference numerals have been applied to like elements and wherein.

DESCRIPTION OF THE PREFERRED EMBODIMENTS

A fundamental equation which aids a clear understanding of this invention may be developed from the consideration of the forces acting on a washer 50 (see FIG. 1) which is provided with an opening 52 generally centrally located through which a longitudinally extending generally circular shaft 54 is positioned for sliding movement with respect to the washer 50.

Figure 1:
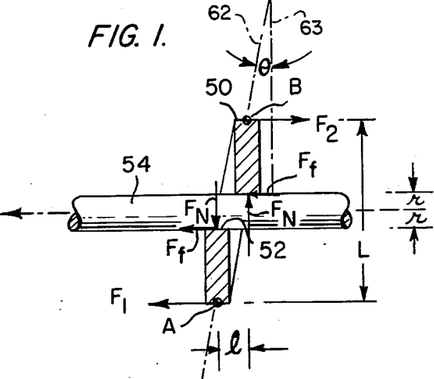
FIG. 1 is a schematic illustration of a device including an external tensile element.

With the washer 50 restrained against relative motion with respect to the shaft 54 by a force $F_2$ when a force $F_1$ is applied to the washer 50, the force couple caused by forces $F_1$ and $F_2$ causes the washer 50 to be biased into surface contact with the shaft 54. The surface contact generates a friction force $F_f$ at two points on the washer at the opening 52. Simultaneously, a normal force $F_n$ is developed on the opening 52 which defines a force couple acting for the distance L to resist the moments induced by the forces $F_1$, $F_2$.

To avoid friction locking between the washer 50 and the shaft 54, the force $F_1$ must be greater than twice the friction force $F_f$. With this relation and the classical definition coefficient, $\mu$, classical force and moment equations may be readily solved for the ratio $$\frac{F_2}{F_1} = 1 + \frac{2\mu L}{l} + 2\left(\frac{\mu L}{l}\right) + 2 \ldots$$

where L is the distance between lines of action for $F_1$ and $F_2$ and $l$ is the distance between lines of action for the normal forces $F_n$.

The ratio $F_2/F_1$ is defined as an amplification ratio, A, which represents the mechanical force multiplication available to each of a plurality of motion damping elements.

The value of $\mu L/l$ ranges between 0 and ½ when the element is designed to avoid friction locking. To a first approximation, the amplification A can thus range between a lower limit of 1 and an upper limit of 2. If, however, the full equation for the amplification A is used and the number of terms in the geometric series is allowed to approach infinity, the value of A will lie between 1 and 3.

Experimentally, a value for the amplification A closely approaching 2.0 as an upper limit has been attained. The theoretical upper limit of 3, based on the mathematical model, may not actually be attainable due to the disparate values of static and dynamic friction coefficients, among other considerations.

Elements such as the washer 50 are referred to herein as external tensile elements. More specifically, it will be noted that the forces $F_1$, $F_2$ generate a tensile force on the washer 50 and that the washer 50 is disposed externally of the guide 54.

Figure 2:
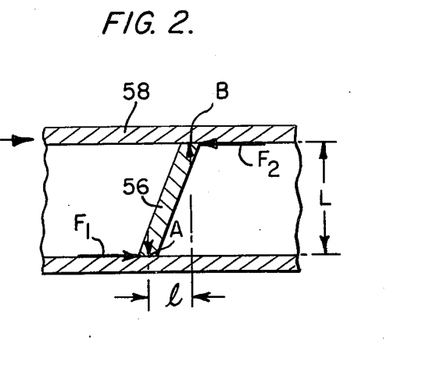
FIG. 2 is a schematic illustration of a device including an internal compressive element.

Turning now to FIG. 2 a second embodiment of the basic force multiplication element is disclosed. In FIG. 2 the force multiplication element is classified as an internal compressive element for the reason that the washer 56 is disposed internally with respect to a guide 58. In addition, the input force $F_1$ cooperates with the output force $F_2$ to create a compressive force couple which acts on the washer 56 to urge it into frictional contact with the internal surface of the guide 58.

Considering FIG. 2 in further detail it will be apparent that, if a second washer 56 is placed within the guide 58 such that it is mutually inclined with respect to the element 56 and satisfies the required conditions for no friction locking, the force $F_2$ on the first washer corresponds to an input force exerted against the second element. If the second end of the second element is then fixed against an abutment, the force exerted against the abutment will be multiplied by the amplification ratio A times the output force $F_2$ from the first input member. This result may be extrapolated for additional elements. Accordingly, with two or more elements, the ultimate force is exponentially related to the amplification ratio and the number of inclined washers 56.

For the embodiment of FIG. 1, that is the external tensile elements, the forces $F_1$, $F_2$ have a line of action essentially parallel to the shaft 54 and are spaced apart by a distance L. The normal forces $F_n$ have a line of action transverse of the shaft 54 and are spaced axially of the shaft by a distance $l$. A point A is defined by the intersecting lines of action of $F_1$ and the corresponding normal force $F_n$; a point B is defined by the intersecting lines of action of $F_2$ and its corresponding normal force $F_n$. A line 62 intersecting the points A and B defines an angle, $\Theta$, with respect to a normal, or perpendicular, line 63 extending from the surface of shaft 54. To ensure that friction locking is avoided, the angle $\Theta$ must exceed arctangent $92\mu$). The value of $\mu$ is the dry static friction coefficient for sliding friction between the washer material and the shaft material. An identical relation is obtained for the internal compressive element 56 of FIG. 2.

Figure 3:
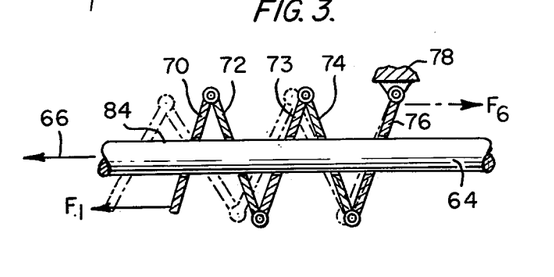
FIG. 3 is a schematic illustration of a device including a plurality of external tensile elements.

Turning now to FIG. 3, a linear motion inhibitor or braking device according to one embodiment of the invention is disclosed in detail. A shaft 64 is adapted for longitudinal motion along its axis. When the shaft 64 moves in the direction of the arrow 66 its motion can be controlled by the use of a plurality of mutually inclined external tensile elements 70, 72, 74, 76. The elements are mutually inclined with respect to one another and are pivotally connected in force transmitting relationship. The end element 76 is restrained from movement relative to the shaft 64 by a suitable restraining means 78. The free end of the element 70 is adapted to have a control force $F_1$ applied thereto.

Figure 4:
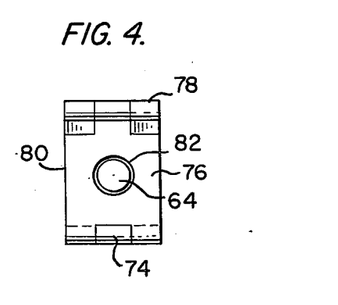
FIG. 4 is an end view of the device shown in FIG. 3 to illustrate the clearance between the shaft and the elements.

Turning now to FIG. 4 each of the elements, e.g., 76, may be provided with hinges that are internally disposed with respect to the external perimeter 80. Each element is preferably provided with a centrally positioned opening 82 which may be generally circular so that it may be concentrically or eccentrically spaced from the shaft 64 positioned therethrough.

The opening 82 is spaced from the shaft 64 when the plurality of elements 72, 74, 76, 70 are in a relaxed state and not frictionally engaging the shaft 64.

When a control force $F_1$ is exerted at the free end of element 70 the element 70 is rotated into frictional engagement with the surface 84 of the shaft 64. The frictional contact between the element 70 and the shaft 64 causes the element 70 to be carried in the direction of arrow 66. In so doing, the next element 72 is rotated into frictional contact with the shaft surface 84 and is likewise carried with the shaft 64 in the direction of arrow 66.

The external tensile elements are thus progressively engaged with the surface 84 of the shaft 64 as the shaft 64 moves through the openings 82 in each element. Accordingly, the braking apparatus of the present invention does not allow the shaft 64 to be impulsively loaded. For example, as the shaft 64 is engaged by the motion limiting apparatus, the apparatus is gradually and sequentially engaged. With each of the elements fully engaged, the connected links assume the extended position illustrated by the phantom lines in FIG. 3.

Considering the element 70 in the engaged position it will be apparent that the force acting on the hinge between elements 70 and 72 is the force $F_1$ multiplied by the amplification ratio A for the link 70. Similarly, the force acting in the hinge between elements 72 and 73 is the force acting in the hinge between elements 70 and 72 multiplied by the amplification ratio A. The force in the remaining hinges increases geometrically when the elements are identical such that the force $F_6$ eventually acting between the end element 76 and the support 78 is defined by the product of the amplification ratio and the force leaving the element 74 at the hinge.

Since the difference in the forces acting at the opposite ends of each element 70, 72, 73, 74, 76 is the friction force exerted on that element by the shaft 64 moving through the opening 82, the friction force acting on each of the elements is also geometrically related to the friction force acting on each of its adjacent elements. More specifically, the friction force acting on element 72 is the amplification ratio A times the friction force acting on element 70. In addition, the friction force acting on element 73 is the amplification ratio multiplied by the friction force acting on element 72. It is the summation of the friction forces applied by each of the elements in the progressive linkage which generates a drag force to control the longitudinal movement of the shaft 64.

As the force $F_1$ is increased, the drag force exerted on the shaft 64 by each element is proportionally increased. The force acting at the restraining means 78 can be determined as the control force $F_1$ multilied by the amplificxation ratio raised to a power corresponding to the number of links in the assembly.

When the shaft 64 moves in a direction opposite to the arrow 66, the mutually inclined elements do not exert a control or retarding influence. Thus, the actuator ordinarily acts unidirectionally.

Figure 5:
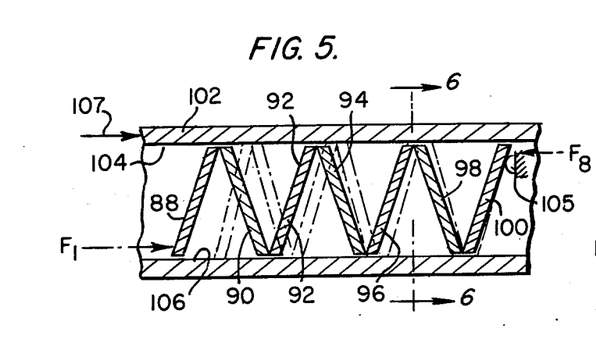
FIG. 5 is a schematic illustration of a device including a plurality of internal compressive elements illustrated in the relaxed position and in the engaged position.

Turning now to FIG. 5 a linear motion inhibitor utilizing internal compressive elements is disclosed in detail. A plurality of internal compressive elements 88, 90, 92, 94, 96, 98, 100 are arranged in mutually inclined relationship within a guide member 102. The guide member 102 has a pair of friction surfaces 104, 106 adapted for engagement by corresponding ends of the elements 88, 90, 92, 94, 96, 98, 100.

Each mutually inclined element is an abutment with an adjacent element along each edge that is frictionally engaged by the surfaces 104, 106. The terminal element 100 may be provided with a suitable restraining means 102 which inhibits relative movement of the plurality of elements relative to the guide 102.

Figure 6:
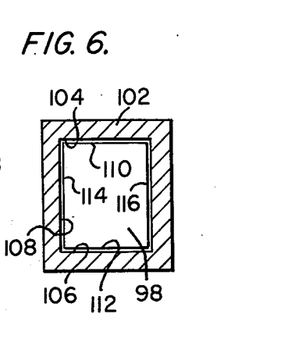
FIG. 6 is a cross sectional view of the device taken along the line 6—6, FIG. 5.

The guide 102 is adapted for movement in the direction of the arrow 107. Turning to FIG. 6, the guide 102 has a generally rectangular configuration having a hollow central channel 108 having an upper surface 104 and a lower surface 106. The surfaces 104, 106 are adapted to be engaged by corresponding parallel edges 110, 112 of the internal element 98.

The upper and lower edges 110, 112 respectively of the element 98 are spaced slightly from the corresponding surfaces 104, 106 when the element 98 is not in frictional engagement with the guide 102. The vertically extending edges 114, 116 of the element 98 are spaced from the corresponding edges of the channel 108 at all times and are preferably designed not to engage the sides of the channel.

When a control force $F_1$ is applied to the first element 88 through a suitable force application means, movement of the guide means 102 in the direction 107 causes the free end of element 88 to be engaged by frictional surface 106 and rotate the element 88 into engagement with the upper frictional surface 104.

Continued movement of the guide 102 causes the element 88 to rotate the element 90 into engagement with the guide; this action continues progressively until the links assume a configuration illustrated by the phantom lines in FIG. 5. When fully engaged, all the elements are frictionally engaging the upper and lower surfaces 104, 106 of the guide 102. As each of the elements 88, 90, 92, 94, 96, 98, 100 constitute free bodies in the mechanical sense, the mechanical force amplification phenomenon, described above in connection with FIG. 3 also applies.

Accordingly, the force $F_8$ exerted by the restraining means 105 is geometrically related to the force in each of the other elements. In addition, the force $F_8$ is proportional to the input force $F_1$ times the amplification ratio for each element raised to a power corresponding to the number of elements between the force $F_1$ and the restraining means 105.

It will thus be seen that the chain of links as described in connection with both FIGS. 3 and 5 can be effective to exert a very large control or restraining force on a relatively moving member while being energized by a relatively low control force. Moreover, the magnitude of the control force is governed by the input force. A further beneficial aspect is that the elements connected in force transmitting relationship with respect to one another provide a self energizing feature which causes the entire chain to become sequentially engaged when the control force causes engagement of the first element. The progressive nature in which the engagement occurs causes a gradual engagement of the adjacent links and therefore substantially avoids impulsive forces being applied to the relatively moving member and the concomitantly high stresses associated therewith.

The two basic types of linear motion inhibiting devices having been described, i.e., the external tensile and the internal compressive elements, it will be apparent to those skilled in the art that a multiplicity of configurations can be envisioned for the elements and the guides themselves. Accordingly, a small number of the myriad embodiments which may be used are disclosed in the appended drawings and will now be described in more detail.

Figure 7:
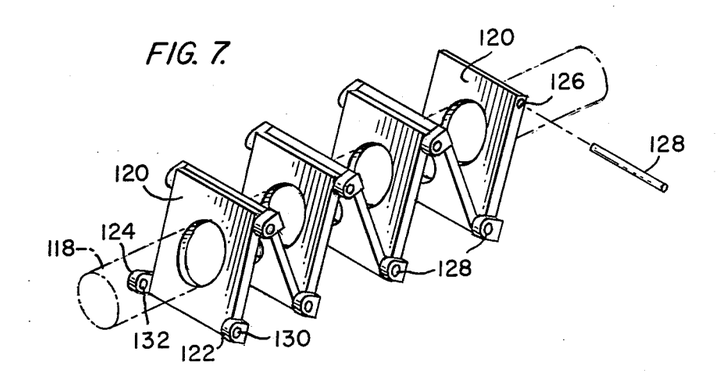
FIG. 7 is a persepective view of external tensile elements with external hinge connections between the adjacent elements.

Turning now to FIG. 7, a plurality of external tensile elements are illustrated in operative position with respect to a generally circular guide 118. Each element 120 is square or generally rectangular in external configuration and is provided at one end with a pair of ears 122, 124. The ears 122, 124 project beyond the plane of the element 120 and extend laterally from the element 120 so that they are external to the perimeter thereof.

Each element 120 is also provided with a bore 126 adapted to receive a pin 128. To assemble the plurality of elements 120 into the accordian-like zigzag assembly, the pin 128 is inserted through the opening 130 of the ear 122, then through the bore 126 in the opposite end of an adjacent element, and then through the opening 132 in the second ear 124.

Figure 8:
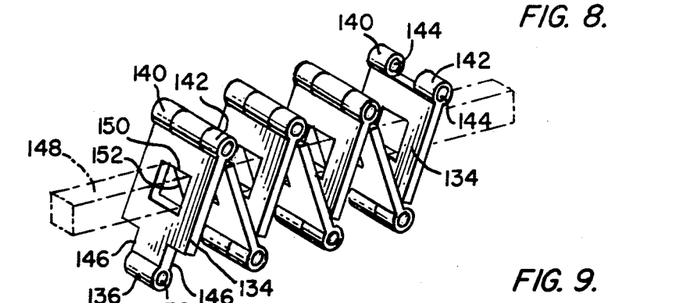
FIG. 8 is a perspective view of external tensile elements with internal hinges and cooperating with a rectangular guide.

In FIG. 8, the connecting means between adjacent elements 134 constitutes an internal hinge. One end of each element 134 may thus be provided with a tongue-like projection 136 having a transverse bore 138 therein. The opposite end of the element 134 may be provided with a pair of projections 140, 142 each of which is provided with a transverse bore 144.

The projections 140, 142 may be generally cylindrical with a transverse axis and are spaced apart laterally with respect to a longitudinal centerline of the element 134 such that they receive the tongue-like projection 136 of an adjacent element 134. A suitable pin may be inserted through the bores 144 at the one end of one element 134 and through the bore 138 of the tongue portion of an adjacent element 134.

The element 134 is provided with a notch 146 to accommodate hinge-like movement of adjacent elements.

In the embodiment disclosed in FIG. 8 the plurality of elements 134 are adapted to receive an elongated guide member 148 having a square or generally rectangular cross sectional configuration. The member 148 is adapted to slide through the openings 150 of each element 134. Moreover, each element 134 is provided with a pair of friction surfaces 152 which cooperate to engage corresponding upper and lower surfaces of the guide bar 148 when the plurality of elements 134 are moved into motion controlling relationship with respect to the bar 148.

Figure 9:
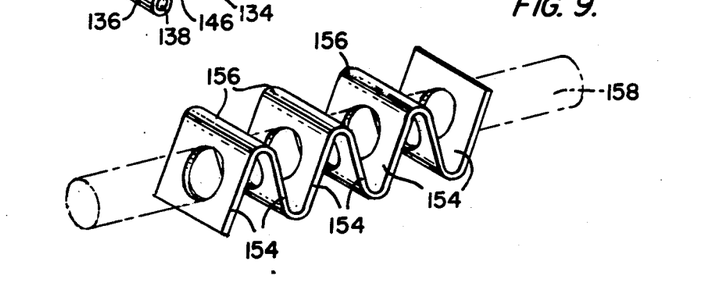
FIG. 9 is a perspective illustration of a unitary member providing external tensile operation.

Turning now to FIG. 9, another embodiment of the connection between adjacent elements is depicted in which the adjacent elements 154 are integrally connected with one another by an accurate bend 156. In this embodiment the adjacent elements 154, along with their integral connections 156, define a unitary body which may be used to control relative motion between the unitary body and a shaft 158.

The unitary body is preferably constructed of a resilient material such that the control force can readily overcome restoring force caused by the integral connection 156 and operate effectively on the end element to engage it without significant inhibition.

Any cylindrical shaft having a polygonal cross sectional configuration is readily adapted for use with the external tensile type element. Moreover, while the elements have been disclosed as having a generally square or rectangular plan form, polygonal or contoured shapes may be used as long as the controlling features are maintained: i.e., spacing between the lines of normal force action and spacing between lines of control force action.

Figure 10:
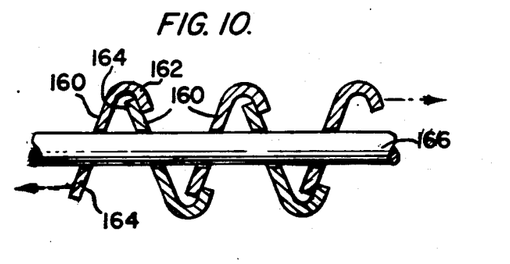
FIG. 10 is a view in partial cross section illustrating external tensile elements with a single hook end.

Accordingly, a candycane configuration of elements 160 (FIG. 10) may also be used to accomplish the braking of relative movement. The elements 160 are provided with a hook end portion 162 and with a generally flat end portion 164. The hook end portion 162 of each element overlaps the flat end portion 164 of an adjacent element 160. The overlapping relationship allows a shorter axial length to be employed while also eliminating hinges and the shear forces acting on hinge pins.

Figure 11:
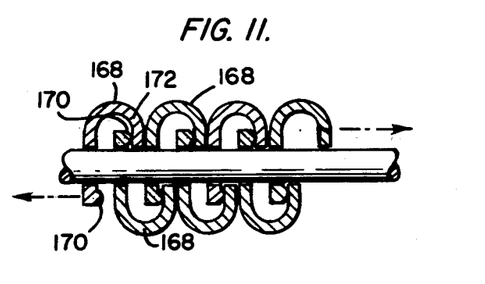
FIG. 11 is a view in partial cross section of external tensile elements having a nesting relationship with respect to one another.

In a nested arrangement of external tensile elements (FIG. 11), each element 168 has a J-shaped cross sectional configuration in which a bead 170 is provided adjacent the straight end portion. The bead 170 of a given element 168 is adapted to engage the inside curved surface of the hook end 172 of an adjacent nesting element 168. In this manner, the axial length required by a plurality of external tensile elements is substantially reduced while the requisite relationship between the lines of force acting on the element can be maintained.

While the external tensile elements already disclosed and discussed employ a single guide, a pair of laterally disposed guides 174 (FIG. 12) may be used in conjunction with the external tensile elements. For convenience, the elements 176 are illustrated with an integral connection between adjacent elements. Each element 176 is provided with a pair of laterally opposed notches 178 that each receive a guide tongue 180 carried by a corresponding lateral guide 174. Accordingly, the lateral guides 174 are preferably spaced apart from one another sufficiently to provide a clearance between the tongue 180 and the narrow portion of the element 176 between the opposed notches 178.

Figures 12, 13, 14, 15:
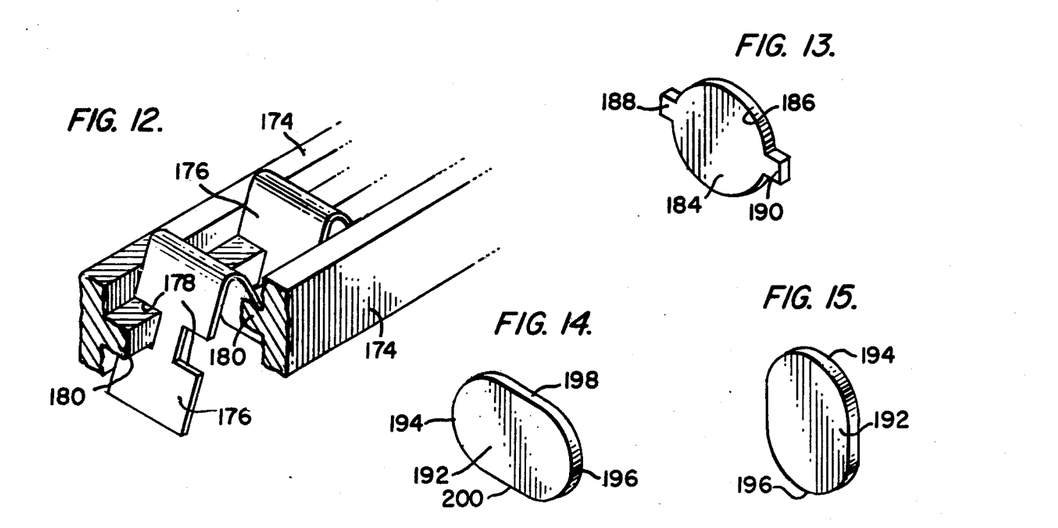
FIG. 12 is a view in partial perspective illustrating a unitary member of the external tensile variety cooperating with a pair of spaced apart guides.
FIG. 13 is a perspective view of an internal compressive element.
FIG. 14 is a persepective view of a second form of an internal compressive element.
FIG. 15 is a perspective view of a third form of an internal compressive element.

In FIG. 13, an internal compressive element 184 is illustrated which has a generally circular perimeter 186 with a pair of radially outwardly projecting diametrically opposed lugs 188, 190. In FIG. 14 an internal compressive element 192 includes a pair of generally semicircular horizontally opposed side portions 194, 196 which are connected by generally parallel sides 198, 200. The element depicted in FIG. 15 is similar to that illustrated in FIG. 14 with the semicircular end portions 194, 196 disposed vertically with respect to one another.

Figure 16:
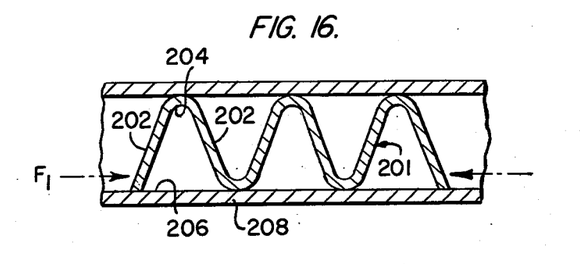
FIG. 16 is a view in cross section of a device including the unitary internal compressor member.

A unitary internal compressive member 201 (FIG. 16) is fabricated from a plurality of elements 202 which are integrally connected at the adjacent end portions thereof by an arcuate portion 204. The unitary member 201 is fabricated from suitable resilient material such that the application of a control force $F_1$ to the unitary member is sufficient to deflect the element into contact with the internal surface 206 of the guide member 208 and to begin the sequential engagement of the subsequent elements 202 thereof.

Figure 17:
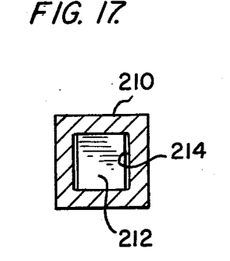
FIG. 17 is a view similar to FIG. 6 illustrating the internal compressive element in an engaged configuration.
Figure 18:
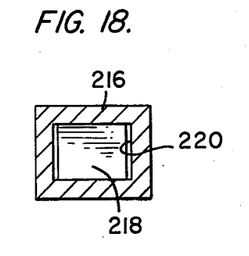
FIGS. 18 and 19 are views in cross section similar to that of FIG. 6 illustrating other forms of the internal compressive elements.
Figure 19:
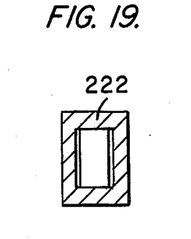

Various cross sectional configurations for a channel and corresponding internal compressive members are illustrated in FIGS. 17, 18 and 19. The internal compressive members are similar to those of FIG. 6 and are depicted in frictional engagement with the guides.

In FIG. 17, a generally square external guide 210 has internal compressive members 212 in frictional contact with two corresponding parallel opposed surfaces of a bore 214. In FIG. 18 the guide member 216 is generally rectangular cross section with a width exceeding its height. Again, the compressive member 218 is in frictional contact with two surfaces of the bore 220 and is spaced from the opposed sides.

In FIG. 19, the cross section of a guide 222 is generally rectangular with a height exceeding the width.

Figure 20:
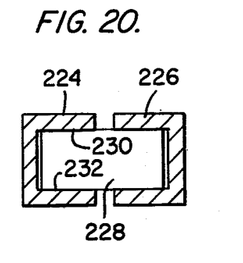
FIG. 20 is a view similar to that of FIG. 6 illustrating internal compressive elements in conjunction with a pair of laterally spaced guides.

Turning now to FIG. 20, an internal compressive element 228 is guided by a pair of laterally spaced generally U-shaped guide channels 224, 226. The internal compressive elements 228 are generally rectangular and engage each of the generally U-shaped channels 224, 226 along the upper edge 230 and along the lower edge 232 of the element 228.

The U-shaped guide channels 224, 226 may be spaced apart to provide access to the elements 228 and so that the elements 228 are not engaged on their side surfaces by the corresponding channel. The lateral spacing between the guide bars 224, 226 may be used to facilitate application of a control force or a restraining force to the plurality of elements 228.

Figure 21:
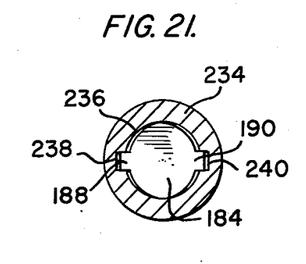
FIG. 21 is a view similar to FIG. 6 illustrating the internal compressive element of FIG. 13 in an engaged position within a guide.

The internal compressive elements 184 (FIG. 13) are shown in an appropriately configured guide member 234 by FIG. 21. The guide member 234 has a generally circular internal bore 236 with a pair of longitudinally extending diametrically opposed slots 238, 240. Each slot 238, 240 receives a corresponding one of the lugs 188, 190 of each internal compressive element 184. The compressive elements 184 engage the bore 236 along an upper portion and along the lower portion thereof so that a side clearance remains with side portions of the bore.

Figure 22:
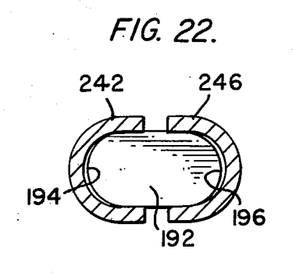
FIG. 22 is a view similar to FIG. 6 illustrating the internal compressive element of FIG. 14 in an engaged position with respect to a pair of laterally spaced part guides.

The elements 192 (FIG. 14) are positioned between a pair of laterally spaced apart guide channels 242, 246 (see FIG. 22). The guide channels 242, 246 are generally U-shaped in cross section and have a substantially arcuate portion. The arcuate portion gives a clearance between the arcuate ends 194, 196 of the element 192 while permitting frictional engagement along the parallel edge portions thereof.

Figure 23:
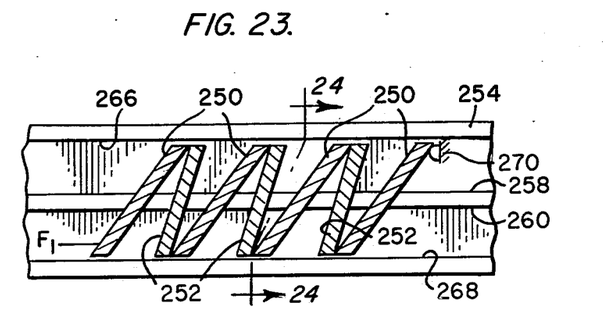
FIG. 23 is a view in partial cross section of a linear braking device illustrating motion inhibiting means utilizing both internal compressive and external tensile elements.

Motions controlling devices have been shown which incorporate exclusively compressive internal elements or tensile external elements. It can be seen from FIG. 23 that the internal compressive type and the external tensile type elements may be combined in a single motion limiting device. For example, a plurality of compressive internal elements 250 may be provided with a plurality of external tensile members 252 intercalated therebetween. The alternating internal compressive elements 250 and external tensile elements 252 may be positioned between a pair of symmetrically arranged guide members 254 having a generally E-shaped cross section (see FIG. 24). Each guide member 254 includes a centrally disposed projection 256 having a pair of bearing surfaces 258, 260 that are frictionally engaged by the external tensile elements such as those of FIG. 12.

Figure 24:
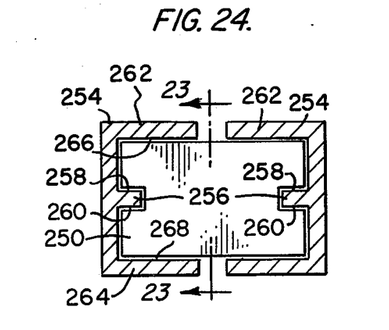
FIG. 24 is a cross sectional view of the device taken along the line 24—24 of FIG. 23.

Each guide 254 is also provided with a pair of projections 262, 264 which are arranged in generally equally spaced relationship relative to the first projection 256. Each projection 262, 264 has an internal surface 266, 268, respectively, on which the internal compressive elements 250 are adapted for frictional contact.

In operation, end surfaces of each internal compressive element 250 frictionally engage the corresponding internal surface 266, 268 when the element 250 rotates toward operative engagement with the guides 254. Opposed surfaces of each side notch in each internal compressive element 250 move farther away from the bearing surfaces 258, 260 of the corresponding guide projection 256.

On the other hand, each external tensile element 252 rotates in a direction opposite to the direction in which the internal compressive element 250 rotates. Accordingly, end surfaces of each external tensile element 252 move farther away from the internal surfaces 266, 268 of the guides 254. At the same time, opposed surfaces of each side notch in each external tensile element moves into frictional engagement with the bearing surfaces 258, 260 of the corresponding guide projection 256.

By considering each element 250, 252 separately it will be seen that the force multiplication phenomenon described above in connection with the internal compressive elements and the external tensile elements still applies. Accordingly, application of a control force $F_1$ to one end element of the alternating plurality of elements causes a force amplification until the motion inhibiting means 270 (see FIG. 23) is fully operative.

Figure 25:
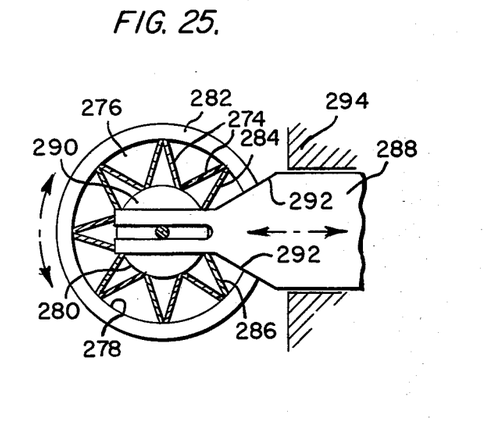
FIG. 25 is a view in partial cross section of a rotary braking device utilizing internal compressive elements.

While the foregoing embodiments have been generally concerned with inhibiting relative linear motion between a pair of members, the basic internal compressive elements may also be used to limit relative rotary motion between a pair of members. Turning now to FIG. 25 a rotary motion limiting device is disclosed which employs a single plurality of internal compressive elements 274 which are disposed within an annular recess 276 defining between a pair of radially spaced cylindrical surfaces 278, 280 of a rotatable guide 282.

The end elements 284, 286 are engaged by a control member 288 which is radially disposed with respect to the hub portion 290 of the guide 288. The control member 288 has a pair of cam surfaces 292 which are operative to engage the end elements 284, 286 and bias the internal compressive elements into frictional engagement with the surfaces 278, 280. The control member 288 may be reciprocably mounted in a suitable block 294.

Figure 26:
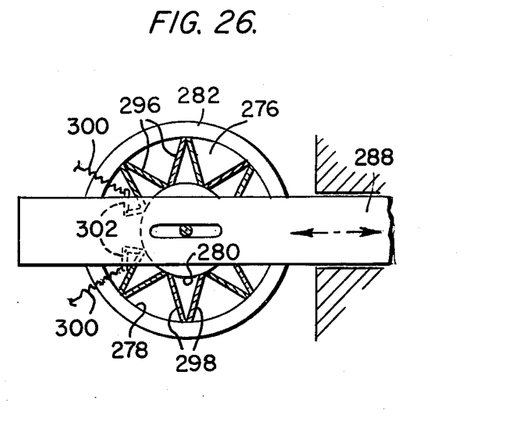
FIG. 26 is a view of a second embodiment of a rotary braking device utilizing internal compressive elements.

In a different embodiment (FIG. 26), a first plurality of internal compressive elements 296 is positioned in the guide member 282 and within a first 180° segment of the annular recess 276. Moreover, a second plurality of internal compressive members 298 are disposed in a second 180° segment of the annular recess 276. In this embodiment the control member 288 has a pair of surfaces 300 near the distal end thereof which cause engagement of the first or second plurality of internal compressive elements 296 or 298 depending on the relative rotation of the guide member 282.

Figure 27:
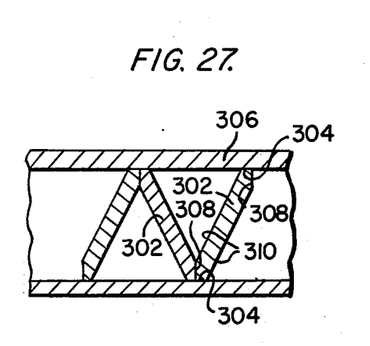
FIG. 27 is a view in partial cross section of a linear braking device illustrating a modified form of internal compressive elements.

A particular form of an internal compressive element is disclosed in FIG. 27 which has been found useful in applications of the invention. The internal compressive element 302 has a cross sectional configuration with a pair of generally parallel friction surfaces 304 for engagement with the internal surfaces of a guide member 306.

The element 302 is also provided with a pair of abutment surfaces 308 which are generally perpendicular to the friction surfaces 304. The abutment surfaces 308 are inclined with respect to the side surfaces 310 such that the friction surfaces 304 will not become frictionally locked against the guide member 306 during motion inhibiting operation. The spacing between the side surfaces 310 is selected such that the element 302 is stiff enough to prevent columnar buckling which may occur in thin plates. In operation (FIG. 27), the abutment surfaces 308 of each element 302 are adjacent to the abutment surfaces of neighboring elements 302.

Figure 28:
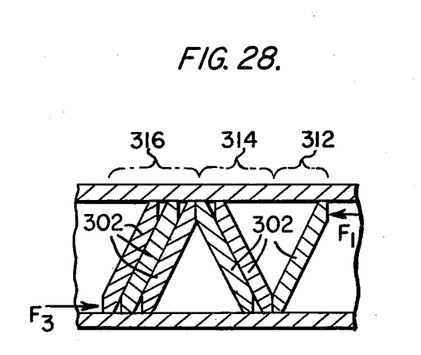
FIG. 28 is a view in partial cross section of a linear braking device illustrating a second modified form of internal compressive elements.

Turning now to FIG. 28 a series parallel configuration of the internal compressive elements 302 is disclosed. In the series parallel configuration higher number stages (i.e., remote from the input force $F_1$) are provided with a corresponding number of elements. For example, a first stage 312 is provided with a single element 302. A second stage 314 includes two parallelly arranged elements 302. Similarly, a third stage 316 is provided with three parallelly arranged elements 302.

The plural elements 302 of each successive stage are mutually inclined with respect to the plural elements of both adjacent stages. The series parallel configuration disclosed permits the forces on each stage to be shared by the plural elements therein so that a single element can be designed for use in high force multiplication systems which might otherwise cause deformation, buckling and the like in the elements.

The use of an element 302 designed as disclosed in FIGS. 27 and 28 will permit design of a single internal compressive element which can be used in the higher force environments of successsve stages without requiring specially designed elements for each successive stage.

Figure 29:
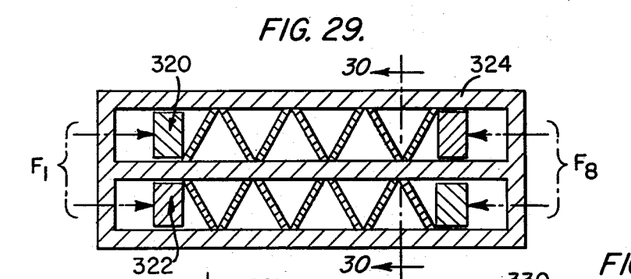
FIG. 29 is a view in cross section of a tandemly operated braking device employing a pair of internal compressive elements.
Figure 30:
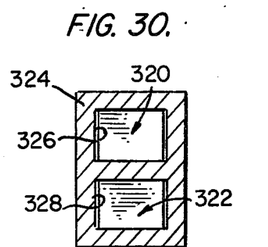
FIG. 30 is a cross sectional view taken along the line 30—30 of FIG. 29.

Turning now to FIG. 29 a parallel pair of internal compressive element assemblies 320, 322 are positioned internally with respect to a guide 324. The guide 324 (see FIG. 30) has a generally rectangular cross section and includes a pair of spaced apart longitudinally extending generally rectangular channels 326, 328. Each channel 326, 328 receives a corresponding compressive element assembly 320, 322.

Figure 31:
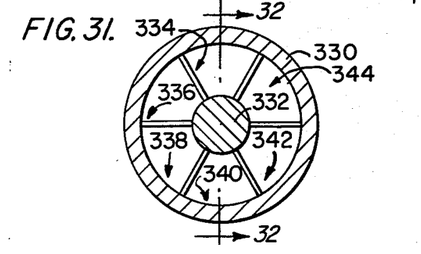
FIG. 31 is a cross sectional view of a modified form of braking device employing a plurality of motion inhibitors working in a parallel mode.
Figure 32:
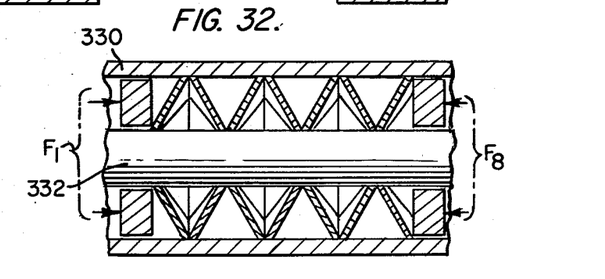
FIG. 32 is a cross sectional view taken along the line 32—32 of FIG. 31.

Another illustration of a plurality of parallelly acting internal compressive element assemblies is disclosed in FIGS. 31 and 32 in which a generally cylindrical external guide 330 is suitably connected to an internal guide 332 such that the external guide 330 and the internal guide 332 are constrained to move together. The internal compressive elements are arranged in a plurality of element assemblies 334, 336, 338, 340, 342, 344. Each of the element assemblies includes a plurality of internal compressive elements, each of which constitutes a segment of the annulus defined between the external guide 330 and the internal guide 332. The internal compressive element assemblies may be equiangularly disposed around the annulus defined between the external guide 330 and the internal guide 332 as illustrated in FIG. 31.

One particularly useful application of linear motion limiting devices constructed in accordance with the present invention is a pipe supporting system which is designed to accommodate low rates of thermal expansion and which is provided with means to prevent rapid accelerations of the piping system relative to the ground such as those that may be induced by earthquakes.

Figure 33:
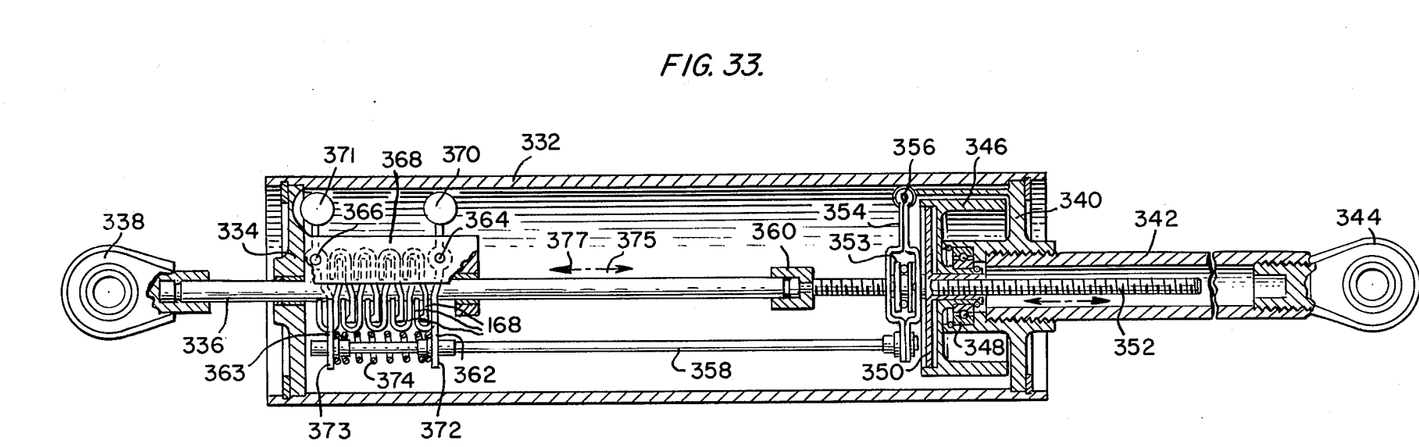
FIG. 33 is a view in partial cross section of a pipe motion inhibiting device incorporating a mechanical force amplifier according to the present invention.

Referring to FIG. 33, the system may include a housing 322 having a closed end 334 from which a shaft 336 projects. The shaft 336 maybe provided with a suitable connector assembly 338 to facilitate its connection with a piping system. The second end 340 of the housing 332 is also closed and includes an outwardly extending sleeve 342 which is provided with a distally disposed mounting end 344.

Disposed within the housing 332 adjacent the second end 340 is a suitable flywheel 346 which is rotatably mounted with respect to the housing 340 by a bearing 348 and which is provided with a suitable nut 350. The nut 350 has a high lead thread which cooperates with a threaded shaft 352 which is longitudinally slidable and generally coaxially disposed with respect to the outwardly projecting sleeve 342. The nut 350 is provided with a flange portion 353 about which a yoke 354 is mounted.

The yoke 354 is pivotally connected to the housing 356 such that longitudinal displacement of the threaded shaft 352 may cause a dislocation of the yoke 354 and, therefore, a longitudinal displacement of a control rod 358 connected to a second end of the yoke 354. The threaded shaft 352 is suitably secured to the distal end of the shaft 336 by means of a coupling 360 such that displacement of the mounting means 338 with respect to the housing 332 causes a corresponding longitudinal displacement of the threaded shaft 352.

The low rates of longitudinal displacement of the shaft 336 caused by thermal expansion induce a rotary motion to the flywheel 346. As long as the flywheel and the nut 350 rotate with sufficiently high angular velocity to advance the ball nut along the threaded shaft 352, there will be no perceptible displacement of the control rod 358 by the yoke 354.

When large longitudinal displacements or accelerations are experienced between the movable mounting end 338 and the fixed mounting end 344, a plurality of nested type external tensile elements 168 cooperate to inhibit longitudinal movement between the shaft 336 and the housing 332. Each of the elements 168 is similar to the element 168 described in greater detail in connection with FIG. 11.

The plurality of elements 168 (see FIG. 33) is arranged in a double acting construction. More specifically, at each end of the plurality of elements 168 is a terminal element 362, 363. Each terminal element 362, 363, is suitably pivotally connected at 364, 366 respectively to a portion 368 of the housing 332. Each terminal element 362, 363 includes a counterweight 370, 371 and a control force applying lever end 372, 373 respectively which is operatively connected to the control rod 358 such that the control rod 358 passes through an opening in the force applying lever end 372, 373.

A suitable control spring 374 is concentrically mounted around and guided by the control rod 358 and extends between the two lever end portions 372, 373 of the terminal elements 362, 363. The control compression spring 374 provides a threshold force which must be overcome by the control rod 358 before the external tensile elements 168 are brought into operative engagement with the shaft 336.

In operation, when displacement is imparted to the shaft 336 causing it to move relative to the housing 332 at a rate which causes a displacement of the yoke 354, the control rod 358 is advanced. For example, assuming that the shaft 336 is advanced in the direction of the arrow 375, the control rod 358 will be advanced in the same direction and will bear against the lever end 372 of end element 363 causing the element 362 to rotate about the pivot 364 and begin the engagement of the force multiplication apparatus comprising the plurality of elements 168. The pivotal end 366 of the second terminal element 363 provides the abutment necessary to restrain relative motion of the plurality of elements 168 with respect to the shaft 336.

When the shaft 336 moves in the direction of arrow 377, the opposite effect is obtained and the control rod 358 moves against the lever end 373 of the second terminal element 363 causing engagement of the plurality of elements 168. In this second instance, the pivot 364 of the first terminal element 362 provides the abutment against which the friction force is applied to restrain motion of the shaft 336. Thus, the control elements 168 arranged as disclosed in FIG. 33 constitute a double acting motion limiting control in that it is operative to inhibit movement of the shaft 336 in either one of its two longitudinal directions 375, 377.

Figure 34:
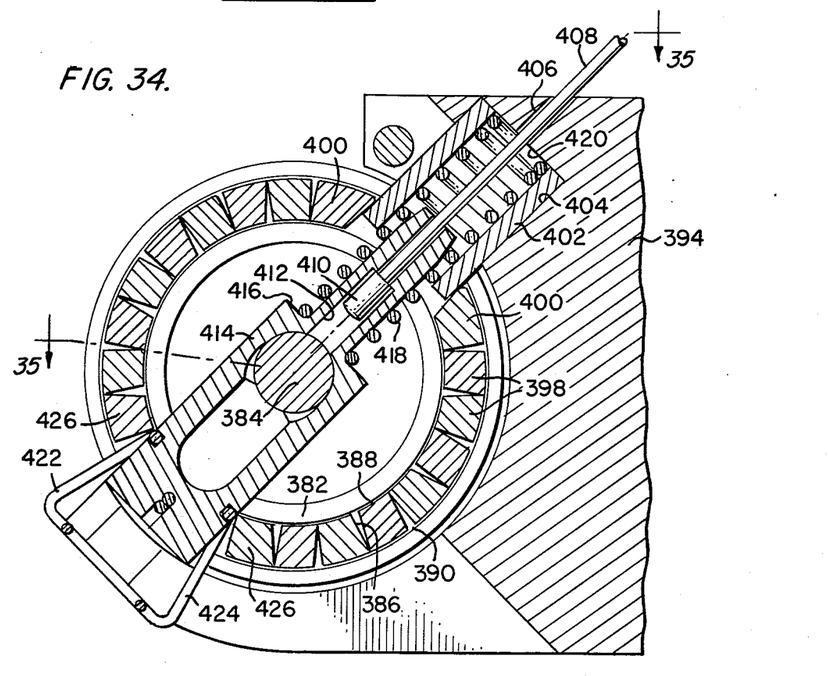
FIG. 34 is a view in partial cross section illustrating a double acting rotary motion inhibiting device utilizing the internal compressive elements according to the present invention.
Figure 35:
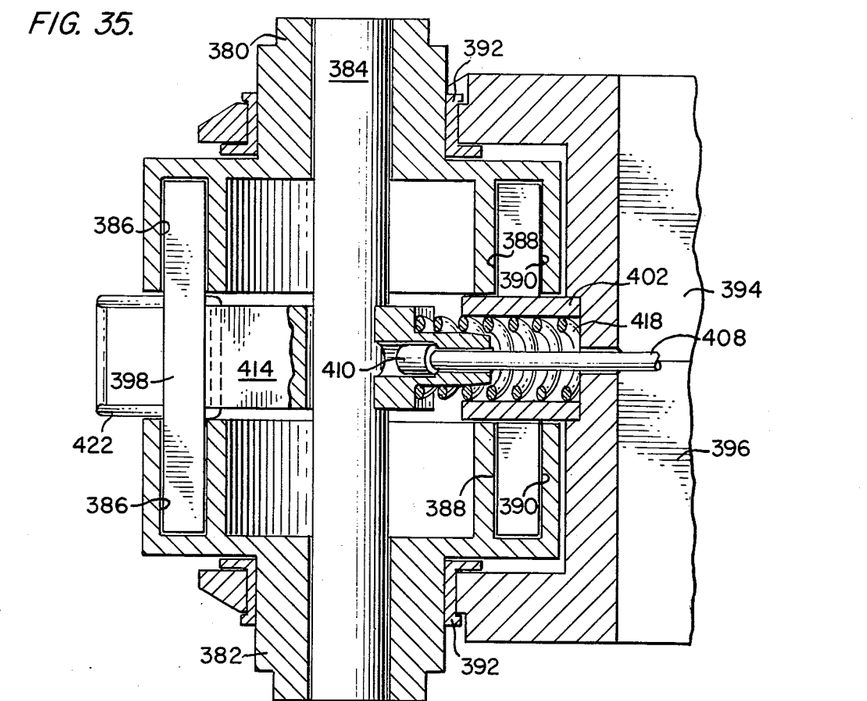
FIG. 35 is a view in partial cross section taken along the line 35—35 of FIG. 34.

FIGS. 34 and 35 illustrate a rotary apparatus using internal compressive elements. With respect to FIG. 35 the rotary motion inhibitor includes a pair or curved guide members 380, 382 which are coaxially disposed relative to one another and which are each suitably connected to a stub shaft 384. The guide members 380, 382 are positioned by the shaft 384 in an opposing spaced apart relationship. Each of the guide members 380, 382 is provided with an annular recess 386 which has a pair of generally cylindrical surfaces 388, 390 which are adapted for frictional engagement by the internal compressive elements to be described.

The guide members 380, 382 are mounted by suitable journal bearings 392 to corresponding portions 394, 396 of a base member. Turning now to FIG. 34 the annular recess 386 is provided with a plurality of internal compressive elements 398 which are mutually inclined with respect to one another and which are adapted to engage the radially inward surface 388 and the radially outward surface 390 of the recess 386. It will be noted from FIG. 35 that the elements 398 extend between the two spaced apart guide members 380, 382 and are received by the annular recess 386 in each of the guide members with a clearance at the bottom of each annular recess 386.

Returning to FIG. 34, it will be noted that the end compressive elements 400 are adapted to engage a sleeve 402 which is mounted within a corresponding bore 404 of the base portions 394, 396. The sleeve is coaxially disposed with respect to a small bore 406 that receives a control rod 408. The control rod 408 has an enlarged end 410 which is received by a counter bore 412 of a control element 414.

The control rod 408 is thus slidably connected with respect to the control element 414. The control element 414 includes a generally radial shoulder 416 against which one end of a compression spring 418 abuts. The second end of the compression spring 418 abuts the bottom end 240 of the bore 404 and causes the control element 414 to assume the position depicted in FIG. 34 where it is in sliding engagement with the shaft 384.

The distal end of the control element 414 is provided with a pair of outwardly flared members 422, 424 which extend out from the control element 414 in an inclined direction.

In operation, when the control rod 408 is pulled radially outwardly with respect to the shaft 384, the enlarged end 410 engages the counter bore 412 and simultaneously shifts the control element 414 in the direction of the shaft 408 and against the bias of the spring 418. Subsequently, the flared members 422, 424, carried by the distal end of the control element 414, engage the control force applying element 426 and cause the plurality of internal compressive elements 398 to frictionally engage the cylindrical surfaces 388, 390. Accordingly, a small control force applied to the control rod 408 generates a large friction force opposing relative rotation between the guide members 380, 382 and the fixed portions 394, 396.

It will now be apparent to those skilled in the art that there has been provided in accordance with the present invention a new and useful means for mechanically multiplying a control force to generate a motion inhibiting force to restrain movement between relatively movable members. It will also be apparent to those skilled in the art that numerous modifications, vari-

What is claimed is:

1. Relative motion inhibiting apparatus comprising:
an elongated member having a surface;
a plurality of mutually inclined element means in force transmitting relation to one another including terminal element means and at least one element means between said terminal element means, each element means being proportioned such that friction locking of that element means is avoided and having a friction surface which engages the surface of the elongated member, the plurality of element means cooperating such that each element means exerts a friction force on the elongated member and such that the friction force exerted by each successive element means between the two terminal element means has an essentially constant ratio to the friction force generated by adjacent element means, the plurality of element means and the elongated member being relatively movable;
restraining means for inhibiting movement of one terminal element means of the plurality of element means; and
control means for inducing a control force on the other terminal element means during relative movement between the plurality of element means and the elongated member, the control force causing a proportional friction force substantially greater than the control force to be exerted on the elongated member by the plurality of element means.

2. The apparatus of claim 1 wherein each element means has a first end portion and a second end portion, an input force acts on the first end portion, a restraining force acts on the second end portion, a friction inducing normal force acts on each of the first and second end portions, a first point is defined by the intersection of lines of action of the input force and the normal force acting on the first end portion, a second point is defined by the intersection of lines of action of the restraining force and the normal force acting on the second end portion, and a line connecting the first and second points defines an acute angle with a normal to the surface of the elongated member which angle exceeds the arctangent of two times the friction coefficient between the friction surface of the element means and the surface of the elongated member so that friction locking between the element means and the elongated member is avoided.

3. The apparatus of claim 2 wherein each element means includes a pair of friction surfaces which frictionally engage the elongated member.

4. The apparatus of claim 2 including means for pivotally connecting adjacent element means together in force transmitting relationship.

5. The apparatus of claim 2 wherein the control means includes biasing means for establishing a threshold force which must be exceeded before the control force becomes operative.

6. The apparatus of claim 2 wherein each element means and each terminal element means is identical.

7. The apparatus of claim 1 wherein:
the elongated member moves in a first direction relative to the plurality of mutually inclined elements; and the control means exerts a control force in the first direction.

8. The apparatus of claim 1 wherein there are at least three mutually inclined element means.

9. The apparatus of claim 1 wherein the elongated member is straight.

10. The apparatus of claim 1 wherein the elongated member is curved.

11. Linear motion inhibited apparatus comprising:
guide means having a bearing surface and a longitudinally extending axis;
a pair of terminal element means longitudinally spaced along the axis;
a plurality of intermediate mutually inclined element means connected in force transmitting relation to one another and to the pair of terminal element means, the terminal element means, the intermediate element means and the guide means being relatively movable, each intermediate element means including friction surface means for frictionally engaging the bearing surface and an opening for receiving the guide means, being proportioned such that friction locking of that element means is avoided, and each intermediate element means exerting a friction force on the guide means such that the friction force exerted by each intermediate element means has an essentially constant ratio to the friction force exerted by adjacent intermediate element means;
restraining means for inhibiting movement of one terminal element means; and
control means for inducing an extensional control force on the other terminal element means operable to move the other terminal element means farther away from the one terminal element means during relative movement between the guide means and the terminal element means and the intermediate element means, causing a proportional friction force, substantially greater than the control force, to be exerted on the guide means by this plurality of intermediate element means.
guide means having bearing surface means;

12. The linear motion inhibiting apparatus of claim 11 wherein each intermediate element means has a first end portion and a second end portion, an input force acts on the first end portion, a restraining force acts on the second end portion, a friction inducing normal force acts on each of the first and second end portions, a first point is defined by the intersection of lines of action of the input force and the normal force acting on the first end portion, a second point is defined by the intersection of lines of action of the restraining force and the normal force acting on the second end portion, and a line connecting the first and second points defines an acute angle with a normal to the surface of the elongated member which angle exceeds the arctangent of two times the friction coefficient between the friction surface of the element means and the surface of the elongated member so that friction locking between the element means and the elongated member is avoided.

13. The linear motion inhibiting apparatus of claim 12 wherein the intermediate element means and the terminal element means are integrally connected with one another and comprise a resilient member.

14. The linear motion inhibiting apparatus of claim 12 wherein the intermediate element means are pivotally connected to one another.

15. The linear motion inhibiting apparatus of claim 12 wherein the guide means has a rectangular cross section and the opening of each intermediate element means has a rectangular configuration permitting clearance with the guide means.

16. The linear motion inhibiting apparatus of claim 12 wherein the guide means has a circular cross section and the opening of each intermediate element means has a generally circular configuration permitting clearance with the guide means.

17. The linear motion inhibiting apparatus of claim 12 wherein:
the guide means includes a pair of generally parallel members each having a bearing surface; and
the intermediate elements include a notched opening in each of two parallel sides to receive the parallel members.

18. The linear motion inhibiting apparatus of claim 12 wherein each intermediate element means includes a hook end portion at one end and a straight end portion at the other end, the hook end portion of one element means overlapping the straight end portion of an adjacent element means.

19. Motion inhibiting apparatus comprising:
guide means having bearing surface means;
a plurality of mutally inclined element means in force transmitting relation to one another, the guide means and the plurality of element means being relatively movable, each element means including friction surface means for frictionally engaging the bearing surface, being proportioned such that friction locking of that element means is avoided, and each element means exerting a friction force which is a constant ratio of that friction force exerted by adjacent element means;
restraining means for inhibiting movement of a first element means; and
control means for inducing a contracting control force on a second element means operable to move the first element means, and a plurality of mutual inclined element means therebetween the second element means toward one another during relative movement between the guide means and the plurality of element means and causing a proportional friction force, substantially greater than the control force, to be exerted on the guide means by the plurality of intermediate element means.

20. The motion inhibiting apparatus of claim 19 wherein each element means has a first end portion and a second end portion, an input force acts on the first end portion, a restraining force acts on the second end portion, a friction inducing normal force acts on each of the first and second end portions, a first point is defined by the intersection of lines of action of the input force and the normal force acting on the first end portion, a second point is defined by the intersection of lines of action of the restraining force and the normal force acting on the second end portion, and a line connecting the first and second points defines an acute angle with a normal to the surface of the guide means which angle exceeds the arctangent of two times the friction coefficient between the friction suface of the element means and the surface of the elongated member so that friction locking between the element means and the elongated member is avoided.

21. The motion inhibiting apparatus of claim 20 wherein the guide means comprises a hollow elongate tube having a rectangular cross section and each element means has a rectangular shape with a width less than the width of the tube cross section.

22. The motion inhibiting apparatus of claim 20 wherein the guide means comprises a pair of generally parallel C-shaped members defining an elongated opening therebetween and each element means has a cross section generally conforming to the elongated opening while maintaining lateral clearance therebetween.

23. The motion inhibiting apparatus of claim 20 wherein the guide means is a hollow elongate tubular member having a generally circular bore with a pair of longitudinally extending diametrically opposed channels and each element means has a pair of diametrically opposed ears received by the corresponding channel.

24. The motion inhibiting apparatus of claim 20 wherein the plurality of element means are integrally connected at the adjacent edges to form a unitary resilient member.

25. The motion inhibiting aparatus of claim 20 wherein the guide means is a tubular member having two generally parallel longitudinally extending channels, and a set of element means is provided for each channel.

26. The motion inhibiting apparatus of claim 26 wherein the guide means comprises a member rotatable about an axis having an annular channel in which:
the plurality of element means are disposed for frictional contact with the circumferentially extending surfaces of the recess.

27. The motion inhibiting apparatus of claim 26 wherein the two sets of element means are disposed in the annular recess and each set inhibits relative retational motion of the member in a corresponding one of the two possible directions.

28. A linear motion inhibitor comprising:
an external guide having an axis and a longitudinally extending bore;
an internal guide coaxial with the external guide, constrained to move therewith, and cooperating with the external guide to define a cavity therebetween;
several sets of internal compressive elements disposed within the cavity frictionally engaging the external guide and the internal guide, the several sets of elements being annularly arranged and each set extending longitudinally of the cavity, each element of each set exerting a friction force which is an essentially constant ratio of the friction force applied by adjacent elements of the same set;
means for restraining one end of each set of elements; and
means for applying a control force to the other end of each set of elements during relative motion between the several sets of elements and the guides, the friction force exerted by each set of elements being related to and substantially greater than the control force applied thereto.

29. The linear motion inhibitor of claim 28 wherein:
the external guide has a generally circular cross section; and
the internal guide has a generally circular cross section.

30. The linear motion inhibitor of claim 29 wherein each compressive element is a segment of an annulus.

31. Motion inhibiting apparatus comprising:
a guide having a pair of spaced apart surfaces;

a plurality of mutually inclined stages of internal compressive elements arranged in force transmitting relation with one another, disposed between the spaced apart surfaces, including two end stages and an intermediate stage at least one stage having at least two parallelly arranged elements, each stage of internal compressive elements exerting a friction force on the guide which is an essentially constant ratio to the friction force applied by adjacent stages, and each element proportioned to avoid friction locking;

means for restraining one end stage; and means for applying a control force to the other end stage during relative motion between the plurality of internal compressive elements and the guide such that the total friction force exerted by the plurality of stages is related to and substantially greater than the control force applied thereto.

32. The motion inhibiting apparatus of claim 31 wherein each stage of internal compressive elements includes at least one additional compressive element than the next adjacent stage in the direction of the means for applying a control force whereby each compressive element is uniformly stressed.

33. Double acting motion inhibiting apparatus comprising:

longitudinal guide means having a bearing surface;

a first and a second end element spaced longitudinally from one another along the guide means;

a plurality of mutually inclined elements positioned between the first and second end elements in force transmitting relation to one another and to the first and second end elements, each inclined element being proportioned to avoid friction locking, exerting a friction force on the guide means and the friction force exerted by adjacent inclined elements having an essentially constant ratio;

means for restraining the first and second end elements;

control means operable to apply a control force to one of the first and second end elements when relative movement of the guide means in a first direction is to be inhibited and operable to apply a control force to the other of the first and second end elements when relative movement of the guide means in a direction opposing the first direction is to be inhibited, the total friction force exerted by the plurality of elements being related to and substantially greater than the control force.

34. Motion inhibiting apparatus comprising:

longitudinally extending guide means having a plurality of bearing surfaces;

a plurality of internal compressive elements operably positioned to selectively engage at least a portion of the bearing surfaces;

a plurality of external tensile elements operably positioned to selectively engage at least a portion of the bearing surfaces and each external tensile element being interposed between two internal compressive elements in force transmitting relation therewith;

each element, whether internal compressive or external tensile, being proportioned to avoid friction locking and exerting a friction force which has an essentially constant ratio to the friction force exerted by the adjacent elements;

means for restraining one internal compressive element against relative movement; and means for applying a control force to one of the plurality of compressive elements and the plurality of tensile elements during relative motion between the guide means and the pluralities of elements, and the total friction force exerted by the pluralities of elements being related to and substantially greater than the control force.

35. The apparatus of claim 34 wherein:

the guide means includes a pair of laterally spaced guides, each guide having an E-shaped cross section and three lateral generally parallel protrusions.

36. The apparatus of claim 35 wherein:

each compressive element is generally rectangular and frictionally engages the upper and lower protrusions of each guide; and each tensile element is generally rectangular and frictionally engages the intermediate protrusion of each guide.

* * * * *